(12) United States Patent
Liu (10) Patent No.: US 11,097,354 B2
(45) Date of Patent: Aug. 24, 2021

(54) GEAR SELF-TIGHTENING DRILL CHUCK (71) Applicant: Yaoting Liu, Weihai (CN)

(72) Inventor: Yaoting Liu, Weihai (CN)

(73) Assignee: Yaoting Liu, Weihai (CN)

( * ) Notice: Subject to any disclaimer, the term of this patent is extended or adjusted under 35 U.S.C. 154(b) by 0 days.

(21) Appl. No.: 16/306,581

(22) PCT Filed: Jun. 5, 2017

(86) PCT No.: PCT/CN2017/087224
§ 371 (c)(1),
(2) Date: Dec. 2, 2018

(87) PCT Pub. No.: WO2017/206964
PCT Pub. Date: Dec. 7, 2017

(65) Prior Publication Data
US 2019/0184470 A1 Jun. 20, 2019

(30) Foreign Application Priority Data

Jun. 3, 2016 (CN) .......................... 201610395450.4

(51) Int. Cl.
*B23B 31/12* (2006.01)
(52) U.S. Cl.
CPC ...... *B23B 31/1207* (2013.01); *B23B 31/1253* (2013.01); *B23B 2231/38* (2013.01)
(58) Field of Classification Search
CPC ............ B23B 31/1253; B23B 2231/38; B23B 31/1207; B23B 51/12
USPC ..................................... 279/60–65
See application file for complete search history.

(56) References Cited

U.S. PATENT DOCUMENTS

| | | | | |
|---|---|---|---|---|
| 928,180 | A * | 7/1909 | Church | B23B 31/1253 |
| | | | | 279/60 |
| 1,352,951 | A * | 9/1920 | Gilbert | B23B 31/1246 |
| | | | | 279/63 |
| 2,055,916 | A * | 9/1936 | Tautz | B23B 31/1207 |
| | | | | 279/60 |
| 4,786,226 | A * | 11/1988 | Jende | F16B 5/0275 |
| | | | | 411/392 |

(Continued)

FOREIGN PATENT DOCUMENTS

| | | |
|---|---|---|
| CN | 2334533 | 8/1999 |
| CN | 2843690 | 12/2006 |
| CN | 200963691 | 10/2007 |

(Continued)

*Primary Examiner* — Eric A. Gates
*Assistant Examiner* — Paul M Janeski (57) ABSTRACT

A gear self-tightening drill chuck, comprising a rear pressing cover or a retaining ring, a rear body, a main body, a front sleeve, clamping jaws, and driven bevel gears; the rear body is arranged inside the main body; one end of the rear body is provided with a driving bevel gear, the large end thereof being arranged next to the rear body; the driving bevel gear is arranged inside the main body, and is engaged with the driven bevel gears; a plurality of driven bevel gears are arranged uniformly with the axis of the driving bevel gear as the centre line; the driven bevel gears have an inner screw thread; one end of the clamping jaw has an outer screw thread for use together with the inner screw thread; the main body is provided with clamping jaw holes and bevel gear holes.

18 Claims, 6 Drawing Sheets

(56) References Cited

U.S. PATENT DOCUMENTS

2008/0309029 A1* 12/2008 Bodine ............... B23B 31/1215
   279/60
2015/0209871 A1* 7/2015 Liu ................... B23B 31/16083
   279/66

FOREIGN PATENT DOCUMENTS

| CN | 201091928 | | 7/2008 |
|---|---|---|---|
| CN | 202921986 | | 5/2013 |
| CN | 203061937 | U | 7/2013 |
| CN | 203371091 | U | 1/2014 |
| CN | WO2014012215 | A1 | 1/2014 |
| CN | WO2014019148 | | 2/2014 |
| CN | 105904009 | A | 8/2016 |
| CN | 205684790 | U | 11/2016 |
| DE | 3527207 | A1 | 2/1987 |

\* cited by examiner

GEAR SELF-TIGHTENING DRILL CHUCK

The present disclosure claims priority to the Chinese patent application with filing number 2016103954504, entitled "Gear Self-tightening Drill Chuck", filed on Jun. 3, 2016, the contents of which are incorporated herein by reference in their entirety.

TECHNICAL FIELD

The present disclosure relates to the field of machining instruments and the field of electric-powered tools, particularly to a gear self-tightening drill chuck.

BACKGROUND ART

The drill chuck is a tool commonly used for clamping a drilling tool in the industry of mechanical processing and the industry of electric-powered tools.

The drill chuck generally consists of a drill chuck sleeve, an elastic dial ring, a connection block, and a rear cover. In the drill chuck sleeve, axial positioning thereof is realized by the connection block. By moving an insertion hole in a circumferential direction, the drill chuck is enabled to move axially under the action of an internal thread of the elastic dial ring, centering is precisely and automatically achieved and the drilling tool is clamped. In operation, when a drill chuck on which different drilling tools are mounted (such as center drill, drill bit, reamer, and screw tap) needs to be used, a positioning screw may be loosened, and after a sectorial body is rotated to a required position, the positioning screw is fastened tight, and multi-station movement of the drill chuck is realized.

The drill chucks currently commercially available are classified into three types, according to clamping forces thereof in a descending order: keyless drill chuck, spanner drill chuck, and self-tightening drill chuck. The three types of drill chucks have their respective advantages and disadvantages, wherein the keyless drill chuck is low in cost, convenient in operation, light in weight, and wide in application, but has a relatively small clamping force and relatively low accuracy; the spanner drill chuck is relatively low in cost and wide in application, but is relatively inconvenient in operation thereof; the self-tightening drill chuck has a large clamping force and relatively high precision, but is relatively high in cost, relatively heavy in weight, and inconvenient in operation.

With the development of the times, due to the relatively high accuracy, the self-tightening drill chuck is increasingly applied.

There are mainly four types of self-tightening drill chucks currently commercially available: flat jaw self-tightening drill chuck, gear self-tightening drill chuck, internal thread self-tightening drill chuck and external thread self-tightening drill chucks, respectively.

For all of the four structures of the drill chucks, a power is transmitted onto clamping paws through a single-start thread, to realize back and forth movement of the clamping paws in clamping claw holes of a main body (a front body), and further realize clamping or loosening of the drill tool.

However, they still fail to overcome the foregoing disadvantages, moreover, as the clamping force is large, an excessively large extrusion force and frictional force, even a blocked state caused by extrusion, usually occur between the threads transmitting the power, resulting in a defect that the self-tightening drill chuck has to be loosened with the help of a dedicated tool, while the operation is quite inconvenient, and the dedicated tool is easy to lose, consequently, the drill chuck is discarded as it cannot be opened, thus leading to waste.

How to enable the self-tightening drill chuck, which transmits a power through a thread, to both have a suitable clamping force meeting operation requirements, and be capable of achieving simple operation and convenient manual loosening is a technical problem that urgently needs to be solved at present.

SUMMARY

An object of the present disclosure is to provide a gear self-tightening drill chuck, so as to solve the technical problems existing in the prior art.

A gear self-tightening drill chuck provided in the present disclosure comprises a rear pressing cover, a rear body, a main body, a front sleeve, multiple clamping jaws, and driven bevel gears in a same number as the clamping jaws.

The rear body is arranged in the main body.

A driving bevel gear is provided at one end of the rear body.

A big end (large end) of the driving bevel gear is provided to be close to the rear body.

A connection portion configured to be connected to an external device is provided at the other end of the rear body.

The driving bevel gear is arranged in the main body, and is engaged with the driven bevel gears.

The multiple driven bevel gears are uniformly arranged around a center line which is an axis of the driving bevel gear.

An inner hole of each of the driven bevel gears is provided with an internal thread.

One end of each clamping jaw is provided with an external thread in cooperative use with the internal thread of each of the driven bevel gears.

The main body is provided with clamping jaw holes capable of allowing the clamping jaws to pass therethrough and bevel gear holes configured to accommodate the driven bevel gears.

The main body has one end fixedly arranged in the front sleeve, and the other end provided with a rear hole rotationally connected with the rear body.

The rear pressing cover is arranged at the other end of the main body, for fixing the rear body in the rear hole.

The rear pressing cover, the rear body, the driving bevel gear, the main body, and the front sleeve are coaxially arranged.

Each of the internal threads and each of the external threads are all multi-start threads.

Further, the other end of each clamping jaw is provided with two clamping surfaces.

An angle between each of the two clamping surfaces is 120°.

Further, a lead angle $\alpha$ of each of the multi-start threads is in a range of $3.1° \leq \alpha \leq 18.7°$.

Further, each clamping jaw is provided with a positioning groove.

Each of the positioning grooves has a length direction parallel to an axis of the respective clamping jaw, and is capable of cooperating with a respective positioning portion provided on the main body to prevent the respective clamping jaw from rotating.

Further, each of the positioning portions is a positioning screw.

Each of the positioning screws is detachably provided on the main body.

Further, an end of the main body close to the rear body is rotationally provided with a rear sleeve.

Further, an end of the rear body away from the driving bevel gear is provided with a driving portion.

The driving portion is in fixed cooperation with the rear sleeve, for performing rotational driving under the action of the rear sleeve before and after the drill chuck operates, such that the drill chuck is capable of initially clamping or loosening the drilling tool.

Further, the rear sleeve is provided with a driving hole in tight cooperation with the driving portion.

Further, the connection portion is a straight hole having an internal thread or a tapered hole having an internal thread.

Further, the rear sleeve is connected with the rear body by a clamp spring.

Another gear self-tightening drill chuck provided in the present disclosure comprises a rear pressing cover or a retaining ring, a rear body, a main body, multiple clamping jaws, and driven bevel gears in the same number as the clamping jaws.

The rear body is arranged in the main body.

A driving bevel gear is provided at one end of the rear body.

A big end of the driving bevel gear is arranged at an end of the rear body penetrating into the interior of the main body.

A connection portion configured to be connected with an external device is provided at the other end of the rear body.

The driving bevel gear is arranged in the main body, and is engaged with the driven bevel gears;

The multiple driven bevel gears are uniformly arranged around a center line which is an axis of the driving bevel gear.

An inner hole of each of the driven bevel gears is provided with an internal thread.

One end of each clamping jaw is provided with an external thread in cooperative use with the internal thread of the respective driven bevel gear.

The main body is provided with clamping jaw holes capable of allowing the clamping jaws to pass therethrough and bevel gear holes configured to place the driven bevel gears.

One end of the main body is provided with an accommodating hole for drilling tool, and the other end of the main body is provided with a rear hole rotationally connected with the rear body.

The rear pressing cover or the retaining ring is arranged at the other end of the main body, for fixing the rear body in the rear hole.

The rear pressing cover or the retaining ring, the rear body, the driving bevel gear, and the main body are coaxially arranged.

Each of the internal threads and each of the external threads are all multi-start threads.

Further, the other end of each clamping jaw is provided with two clamping surfaces.

An angle between each of the two clamping surfaces is 120°.

Further, a lead angle α of each of the multi-start threads is in a range of $3.1° \leq \alpha \leq 18.7°$.

Further, each clamping jaw is provided with a positioning groove.

Each of the positioning grooves has a length direction parallel to an axis of the respective clamping jaw, and is capable of cooperating with a respective positioning portion provided on the main body to prevent the respective clamping jaw from rotating.

Further, each of the positioning portions is a positioning screw.

Each of the positioning screws is detachably provided on the main body.

Further, an end of the main body close to the rear body is rotationally provided with a rear sleeve.

Further, an end of the rear body away from the driving bevel gear is provided with a driving portion.

The driving portion is in fixed cooperation with the rear sleeve, for performing rotational driving under action of the rear sleeve before and after the drill chuck operates, such that the drill chuck is capable of initially clamping or loosening the drilling tool.

Further, the rear sleeve is provided with a driving hole in tight cooperation with the driving portion.

Further, the connection portion is a straight hole having an internal thread or a tapered hole having an internal thread.

Further, the rear sleeve is connected with the rear body by a clamp spring.

The gear self-tightening drill chuck provided in the present disclosure drives the driving bevel gear by driving rotation of the rear body, further drives the driven bevel gears to rotate, and further drives the clamping jaws to move, to achieve closing and loosening of the clamping jaws, moreover, connecting the clamping jaws and the driven bevel gear by multi-start threads ensures that the drill chuck, after being clamp-closed in operation, can be loosened quite conveniently, then the object that the clamping jaws of the drill chuck can be easily opened manually is achieved, and the operation is simple and convenient.

BRIEF DESCRIPTION OF DRAWINGS

In order to more clearly illustrate embodiments of the present disclosure or technical solutions in the prior art, accompanying drawings which are needed for description of the embodiments or the prior art will be introduced briefly below. Apparently, the accompanying drawings in the description below are for some embodiments of the present disclosure. A person ordinarily skilled in the art still can obtain other accompanying drawings in light of these accompanying drawings, without paying inventive efforts.

REFERENCE SIGNS

1: front sleeve; 2: driven bevel gear; 3: main body; 4: clamping jaw hole; 5: rear hole; 6: clamping surface; 7: clamping jaw; 8: driving bevel gear; 9: rear body; 10: rear pressing cover; 11: rear sleeve; 12: clamp spring; 13: driving hole; 14: driving portion; 15: clamping groove; 16: threaded hole; 17: positioning groove; 18: bevel gear hole; 19: retaining ring; 20: accommodating hole for drilling tool; 21: annular groove.

DETAILED DESCRIPTION OF EMBODIMENTS

Technical solutions of the present disclosure will be described below clearly and completely in combination with accompanying drawings. Apparently, the embodiments described are only a part of embodiments of the present disclosure, rather than all embodiments. All other embodiments, obtained by a person ordinarily skilled in the art based on the embodiments of the present disclosure without any inventive efforts, shall fall into the scope of protection of the present disclosure.

In the description of the present disclosure, it should be indicated that orientational or positional relations indicated by terms "center", "upper", "lower", "left", "right", "vertical", "horizontal", "inner", "outer" and so on are based on orientational or positional relations as shown in the accompanying drawings, merely for facilitating the description of the present disclosure and simplifying the description, rather than indicating or implying that related devices or elements have to be in the specific orientation or configured and operated in a specific orientation, therefore, they should not be construed as limiting the present disclosure.

Besides, terms "first", "second", and "third" and so on are merely for descriptive purpose, but should not be construed as indicating or implying relative importance.

In the description of the present disclosure, it should be indicated that unless otherwise specified and defined explicitly, terms "mount", "join", and "connect" should be construed in a broad sense. For example, it may be fixed connection, detachable connection, or integral connection; it may be mechanical connection, and also may be electrical connection; it may be direct connection, indirect connection via an intermediate medium, or inner communication between two elements. For a person ordinarily skilled in the art, specific meanings of the above-mentioned terms in the present disclosure can be understood according to specific circumstances.

First Aspect

As shown in FIG. 1 to FIG. 7, the present disclosure provides a gear self-tightening drill chuck, comprising a rear pressing cover 10, a rear body 9, a main body 3, a front sleeve 1, multiple clamping jaws 7, and driven bevel gears 2 in a same number as the clamping jaws 7.

The rear body 9 is arranged in the main body 3.

A driving bevel gear 8 is provided at one end of the rear body 9.

A big end of the driving bevel gear 8 is provided to be close to the rear body 9.

A connection portion configured to be connected with an external device is provided at the other end of the rear body 9.

The driving bevel gear 8 is arranged in the main body 3, and is engaged with the driven bevel gears 2;

The multiple driven bevel gears 2 are uniformly arranged around a center line which is an axis of the driving bevel gear 8.

An inner hole of each of the driven bevel gears 2 is provided with an internal thread.

One end of each clamping jaw 7 is provided with an external thread in cooperative use with the internal thread of the respective driven bevel gear 2.

The main body 3 is provided with clamping jaw holes 4 capable of allowing the clamping jaws 7 to pass therethrough and bevel gear holes 18 configured to accommodate the driven bevel gears 2;

The main body 3 has one end fixedly arranged in the front sleeve 1, and the other end provided with a rear hole 5 rotationally connected with the rear body 9.

The rear pressing cover 10 is arranged at the other end of the main body 3, for fixing the rear body 9 in the rear hole 5.

The rear pressing cover 10, the rear body 9, the driving bevel gear 8, the main body 3, and the front sleeve 1 are coaxially arranged.

Each of the internal threads and each of the external threads are all multi-start threads.

The present disclosure is applicable to all self-tightening drill chucks directly or indirectly transmitting a power onto the clamping jaws 7, directly or indirectly through threads, to drive the clamping jaws to move back and forth.

The lead angle of each of the multi-start threads in the present disclosure is based on a pitch diameter of the threads.

A single-start thread is favorable to self-locking, but is unfavorable to loosening. A multi-start thread is favorable to transmission of a power, and favorable to clamping and more favorable to loosening. Moreover, due to an increased contact area between the threads, a clamping force as large as that of the single-start thread is dispersed on a larger contact area, consequently, a unit contact pressure or a unit frictional force of a thread is much smaller than that of the single-start thread, which is more favorable to opening the drill chuck easily. Therefore, in the present disclosure, a multi-start thread is used as a transmission thread between each of the driven bevel gears 2 and the clamping jaws 7.

Figure 1:
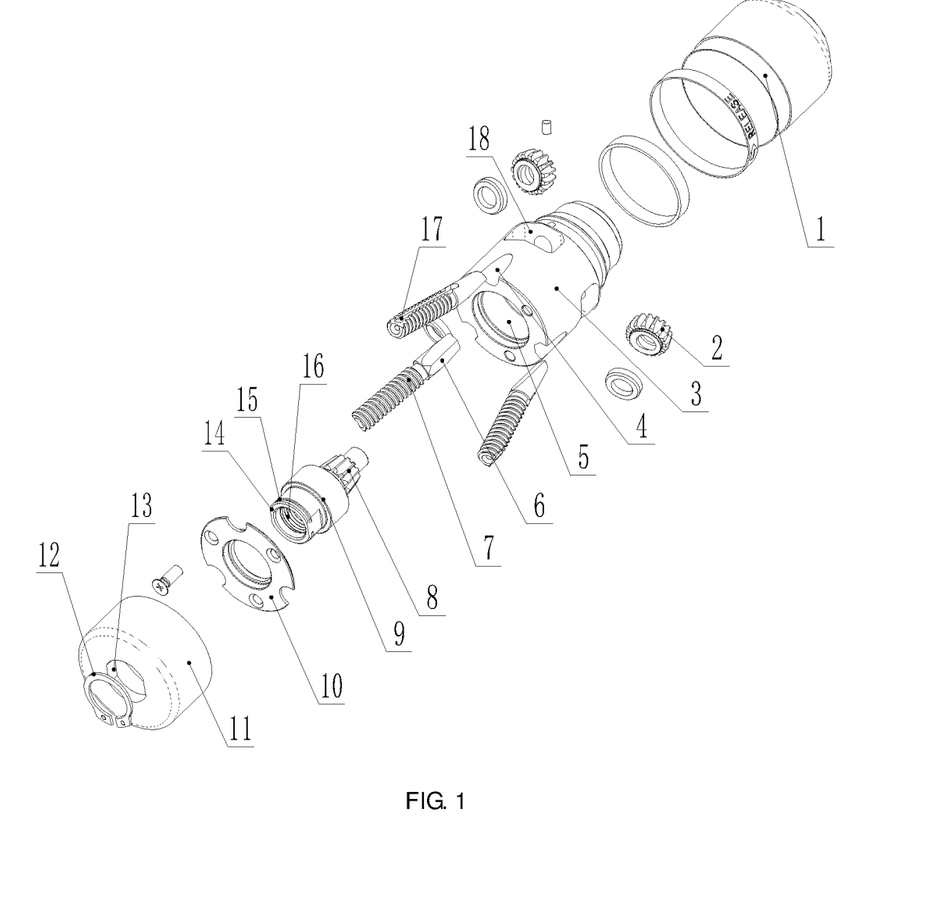
FIG. 1 is an explosive view of a gear self-tightening drill chuck provided in the present disclosure.
Figure 2:
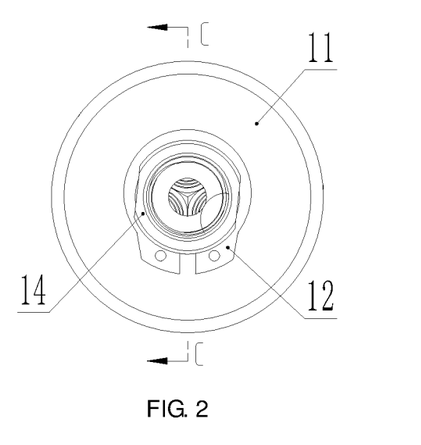
FIG. 2 is a rear view of the gear self-tightening drill chuck provided in the present disclosure.
Figure 3:
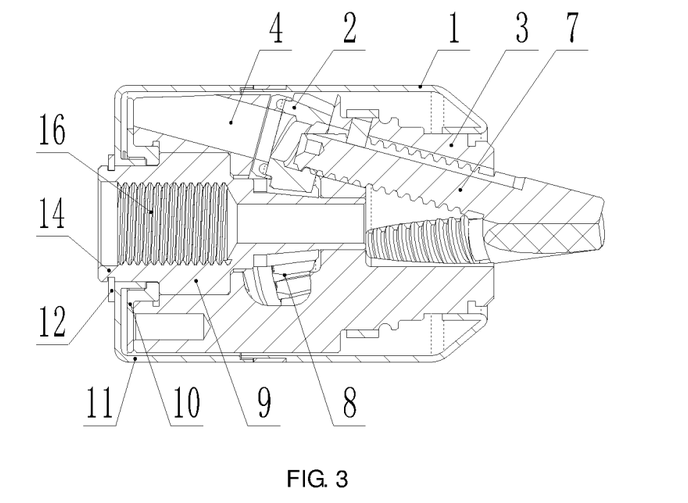
FIG. 3 is a cutaway view of C-C of the gear self-tightening drill chuck shown in FIG. 2.
Figure 4:
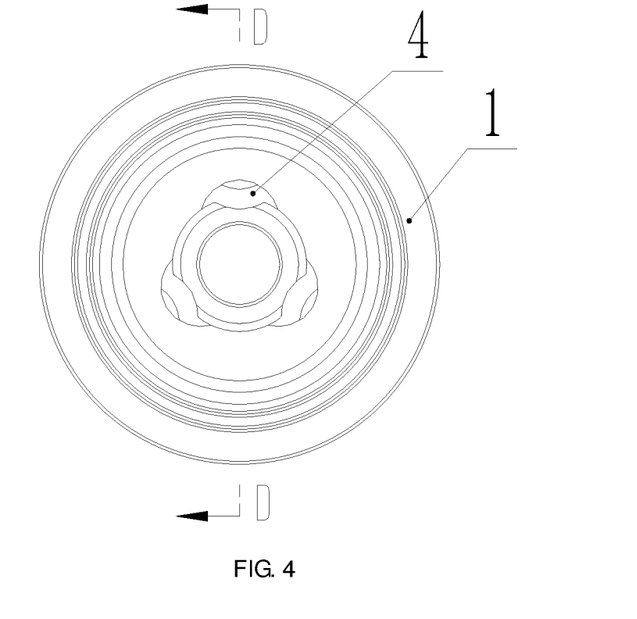
FIG. 4 is a front view of a main body of the gear self-tightening drill chuck provided in the present disclosure.
Figure 5:
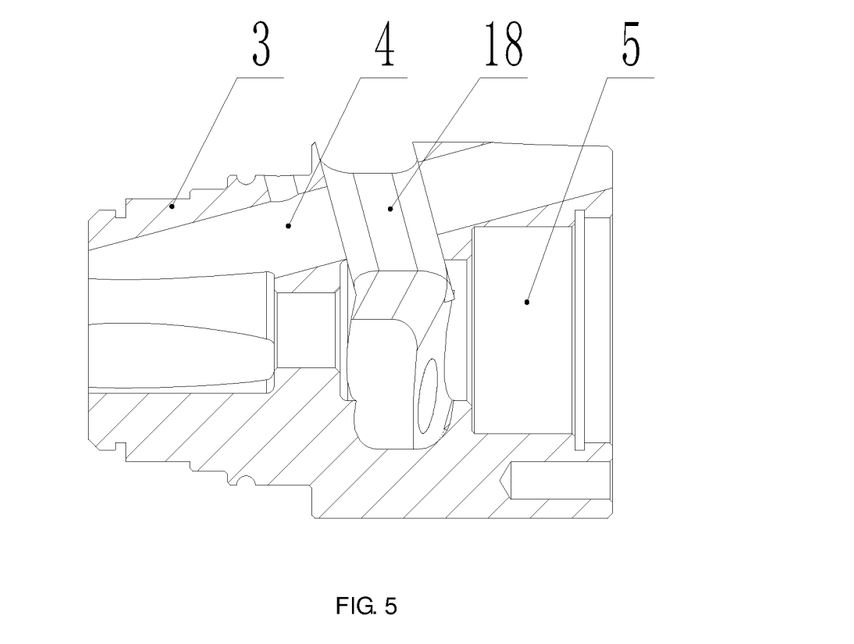
FIG. 5 is a D-D cutaway view of the gear self-tightening drill chuck shown in FIG. 4.
Figure 6:
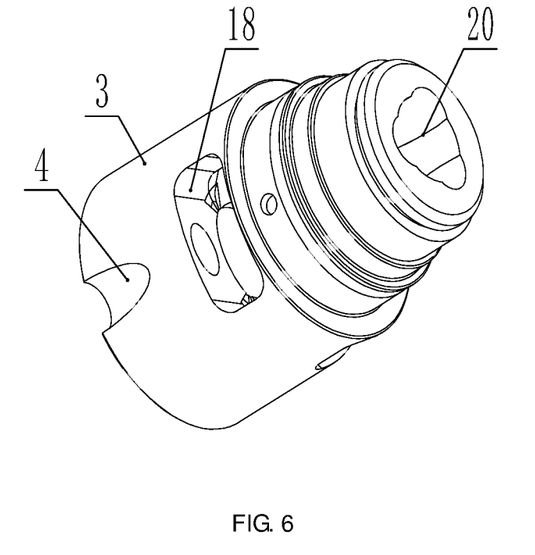
FIG. 6 is a perspective view of the main body of the gear self-tightening drill chuck provided in the present disclosure.
Figure 7:
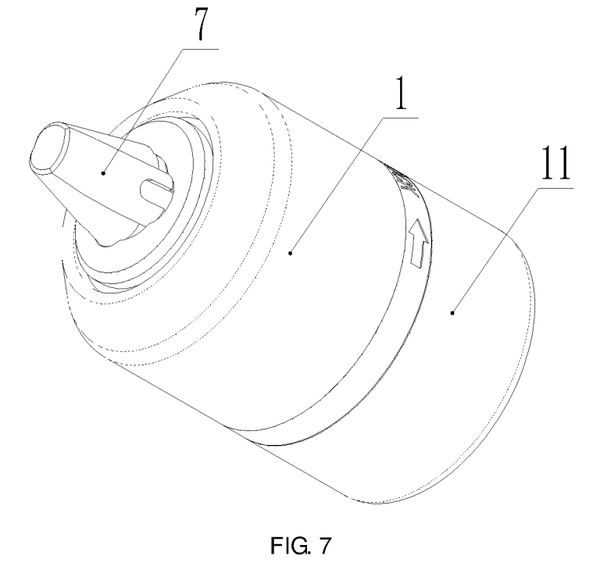
FIG. 7 is a perspective view of the gear self-tightening drill chuck provided in the present disclosure.

The driving bevel gear 8 and the rear body 9 are together arranged in the rear hole 5 of the main body 3, and each of the driven bevel gears 2 is arranged in the respective bevel gear hole 18 of the main body 3, and is engaged with the driving bevel gear 8. Since the rear body 9 is arranged in the rear hole 5 of the main body 3, and the rear body 9 is rotationally connected with the main body 3, in order to ensure stability of the rear body 9 in the main body 3, and to prevent it from escaping from the interior of the rear hole 5 in a process of rotation, a rear pressing cover 10 is arranged at one end of the main body 3 away from the rear body 9, and the rear pressing cover 10 is fixedly connected with the main body 3 by a bolt, and further the rear body 9 is fixed in the rear hole 5, such that the rear body 9 merely can rotate but cannot perform axial movement, thus ensuring stability of the rear body 9 in operation.

In use, by rotating the rear body 9, the driving bevel gear 8 is driven to rotate, the driven bevel gears 2 engaged with the driving bevel gear 8 are further driven to rotate, and the clamping jaws 7 are further driven by the driven bevel gears 2, under the action of the multi-start threads, to move in the clamping jaw holes 4 of the main body 3 respectively, so as to achieve closing or opening of the clamping jaws 7.

The applicant made more than 12000 times of contrast experiment of punching on a cement board for the gear self-tightening drill chuck on an impact drill of 1050 W, with an impact drill bit having a diameter of 12 mm, and with single-start and multi-start threads on the clamping jaws 7 with the same diameter, and the same lead angles of 3°, 4.7°, and 18°, respectively, and data in the following table is obtained.

By comparison of the following tables and a data coordinate graph, advantages of the multi-start threads when the drill chuck is opened can be seen.

TABLE 1

| number of starts of thread | device power | diameter of impact drill bit | lead angle | loosening torque (mean value) |
|---|---|---|---|---|
| single start | 1050 W | Φ12 mm | 3° | 13.1 N · m |
| two starts | 1050 W | Φ12 mm | 3° | 9.4 N · m |
| three starts | 1050 W | Φ12 mm | 3° | 6.7 N · m |

TABLE 2

| number of starts of thread | device power | diameter of impact drill bit | lead angle | loosening torque (mean value) |
|---|---|---|---|---|
| single start | 1050 W | Φ12 mm | 4.7° | 9.7 N · m |
| two starts | 1050 W | Φ12 mm | 4.7° | 4.8 N · m |
| three starts | 1050 W | Φ12 mm | 4.7° | 3.4 N · m |

TABLE 3

| number of starts of thread | device power | diameter of impact drill bit | lead angle | loosening torque (mean value) |
|---|---|---|---|---|
| single start | 1050 W | Φ12 mm | 18° | 8.6 N · m |
| two starts | 1050 W | Φ12 mm | 18° | 4.7 N · m |
| three starts | 1050 W | Φ12 mm | 18° | 3.2 N · m |

Figure 8:
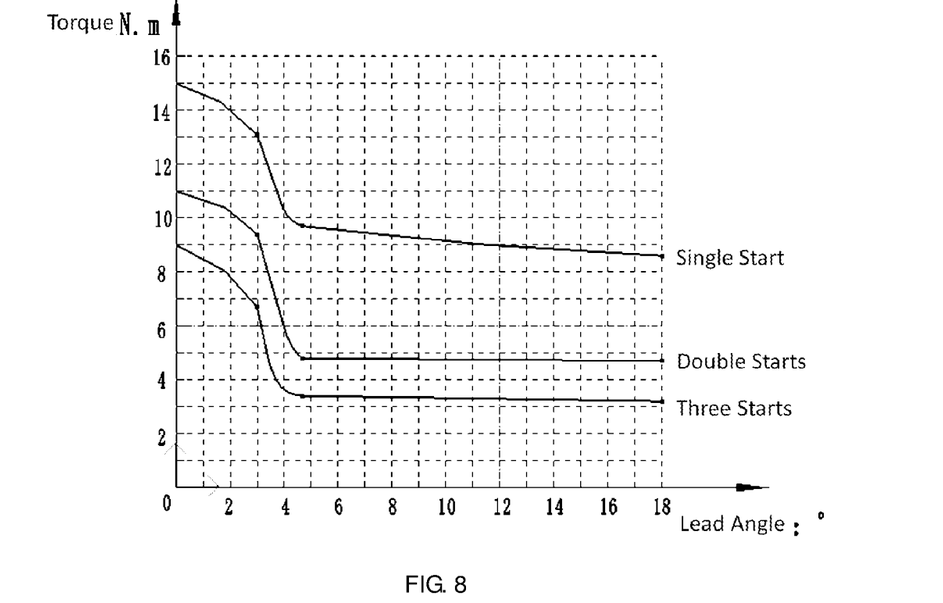
FIG. 8 is a curve graph of torque of the gear self-tightening drill chuck provided in the present disclosure, with different numbers of starts of thread and different lead angles.

It can be seen from the above Table 1, Table 2, Table 3, and FIG. 8 that the larger the lead angle, and the more the number of starts of the thread, the smaller the torque needed when loosening the clamping jaws 7, that is to say, the more labor-saving when loosening the clamping jaws 7.

In a preferred embodiment, the other end of each clamping jaw 7 is provided with two clamping surfaces 6.

An angle between each of the two clamping surfaces 6 is 120°.

In the present embodiment, the clamping jaws 7 are provided in three, each clamping jaw 7 has one end provided with a multi-start thread, and the other end provided with two clamping surfaces 6, the three clamping jaws 7 together have six clamping surfaces 6, and further, by cooperation between the clamping surfaces 6, an article can be completely clamped.

It should be indicated that in the present embodiment, the number of the clamping jaws 7 is three. Therefore, an angle between two clamping surfaces 6 on each clamping jaw 7 is 120°. But the number of the clamping jaws 7 is not merely limited to three, and it also may be four, five, and so on, as long as the angle between the clamping surfaces 6 is correspondingly modified to be 90°, 72° and so on, and an end of each clamping jaw 7 having the clamping surface 6 is enabled to be completely attached with one another in a closed state.

In a preferred embodiment, the lead angle α of each of the multi-start threads is in a range of 3.1≤α≤18.7°.

From repeated multiple times of experiment, it is found that when the lead angle α is smaller than 3.1°, the clamping force will be excessively large, and even a multi-start thread cannot be opened by hand; while when the lead angle α is greater than 18.7°, the clamping force will be reduced greatly, and even a single-start thread cannot clamp a drilling tool (a drill bit) tightly.

Therefore, for the existing self-tightening drill chucks, in order to be both capable of ensuring that the drilling tool can be clamped to meet requirements of industrial production, and capable of meeting the requirement that an operation can be easily performed by hand, a conclusion is drawn in the present disclosure that two conditions have to be fulfilled, that is, the lead angle α is in a range of 3.1≤α≤18.7°.

In a preferred embodiment, each clamping jaw 7 is provided with a positioning groove 17.

Each of the positioning grooves 17 has a length direction parallel to the axis of the respective clamping jaw 7, and can cooperate with a respective positioning portion provided on the main body 3 to prevent the respective clamping jaw 7 from rotating.

Each clamping jaw 7 is provided with the positioning groove 17. With the provision of the positioning groove 17, it can cooperate with the respective positioning portion on the main body 3, to limit a movement direction of the respective clamping jaw 7, and avoid rotation of the respective clamping jaw 7 in a movement process, and further be capable of ensuring that the multiple clamping jaws 7 can be in perfect cooperation.

In a preferred embodiment, each of the positioning portions is a positioning screw.

Each of the positioning screws is detachably provided on the main body 3.

In the present embodiment, each of the positioning portions is a positioning screw, that is, a positioning threaded hole 16 is provided on the main body 3, and the positioning screws are arranged in the positioning threaded hole 16.

When the clamping jaws 7 need to be limited, the positioning screws are tightened up, such that the positioning screws pass through the positioning threaded hole 16 to enter the interiors of the positioning grooves 17 respectively, so as to achieve a function of limiting movement tracks of the clamping jaws 7, meanwhile, the clamping jaws 7 and the main body 3 form one intact entirety.

When the clamping jaws 7 need to be maintained or detached, the positioning screws are loosened, such that they are removed from the respective positioning grooves 17, and further, the clamping jaws 7 can be conveniently drawn out completely from the interiors of the clamping jaw holes 4 respectively.

It should be indicated that each of the positioning portions in the present embodiment is a positioning screw, but they are not merely limited to the one structure of positioning screw, and they also may be in other structures, for example, they may be pin bolts, or sliding blocks, etc., that is to say, as long as they can limit the movement tracks of the clamping jaws 7 by cooperation with the positioning grooves 17 respectively, and further ensure the stability of the clamping jaws 7 in an operation process.

In a preferred embodiment, an end of the main body 3 close to the rear body 9 is rotationally provided with a rear sleeve 11.

In the present embodiment, the rear sleeve 11 is provided to cover the rear body 9, the rear pressing cover 10, and the main body 3, and is in rotational sealed connection with the front sleeve 1, enabling effective protection to internal environment, so as to free it from influence of external environment, prevent pollutants from entering between the main body 3 and the rear body 9, and further ensure rotational stability between the main body 3 and the rear body 9 and the rotation life thereof, and further guarantee service life of the whole gear self-tightening drill chuck.

In a preferred embodiment, an end of the rear body 9 away from the driving bevel gear 8 is provided with a driving portion 14.

The driving portion 14 is in fixed cooperation with the rear sleeve 11, for performing rotational driving under the action of the rear sleeve 11 before and after the drill chuck operates, such that the drill chuck can initially clamp or loosen the drilling tool.

The driving portion 14 cooperates with the rear sleeve 11, for performing rotational driving under the action of the rear sleeve 11.

That is to say, in the present embodiment, the rear body 9 and the rear sleeve 11 are connected therebetween by the driving portion 14, and the rear sleeve 11 can drive the rear body 9 by the driving portion 14, such that the rear body 9 rotates, to further give the driving bevel gear 8 and the driven bevel gears 2 a rotational force, and further give the clamping jaws 7 a force for closing or loosening.

In a preferred embodiment, the rear sleeve 11 is provided with a driving hole in tight cooperation with the driving portion 14.

In the present embodiment, the driving portion and the driving hole are in structures as shown in FIG. 1, that is, two opposite sides on a side wall of the cylinder are provided with two planes, and on the rear sleeve 11 a driving hole 13 in a corresponding structure is provided. Transmission of the rotational force can be realized by cooperation between the driving hole 13 and the driving portion 14.

It should be indicated that the driving portion and the driving hole may be in structures in the present embodiment, but they are not merely limited to such structures, and they also may be in other types of structures, for example, the driving portion may be in a structure with a square head, an oval head, and so on, and the driving hole is in a structure cooperating with the driving portion in such a structure, that is to say, as long as the transmission of the rotational force can be realized by the cooperation between the driving hole 13 and the driving portion 14.

In a preferred embodiment, the connection portion is a straight hole having an internal thread or a tapered hole having an internal thread.

In the present embodiment, the rear body 9 is connected with a device by the threaded hole 16 having an internal thread.

It should be indicated that in the present embodiment, the threaded hole 16 is a straight hole or a tapered hole, and also may be other types of threaded holes, as long as it can be connected together with other devices.

It should also be indicated that there still may be many connection modes for the rear body 9 and a device, for example, pin shaft connection, and hinged connection, etc., that is to say, as long as the rear body 9 and the device can be connected together.

In a preferred embodiment, the rear sleeve 11 and the rear body 9 are connected therebetween by a clamp spring 12.

In the present embodiment, on a portion of the rear body 9 extending from the rear sleeve 11 a clamping groove 15 is provided, the clamp spring 12 is arranged in the clamping groove 15, to further axially connect the rear sleeve 11 with the rear body 9, ensuring that no axial displacement occurs between the rear sleeve 11 and the rear body 9.

It should be indicated that in the present embodiment, the connection between the rear sleeve 11 and the rear body 9 is a connection by clamp spring 12, but it is not merely limited to such one connection mode, and it also may be other connection modes, for example, it may be pin shaft connection or the like, as long as a axial freedom degree between the rear sleeve 11 and the rear body 9 can be restricted.

The gear self-tightening drill chuck provided in the present disclosure drives the driving bevel gear 8 by driving rotation of the rear body 9, further drives the driven bevel gears 2 to rotate, and further drives movement of the clamping jaws 7, to achieve closing and loosening of the clamping jaws 7, moreover, connecting the clamping jaws 7 and the driven bevel gears 2 by multi-start threads ensures that the clamping jaws 7, after being clamp-closed, can be loosened quite conveniently, then an object that the clamping jaws 7 can be opened manually is achieved, and the operation is simple and convenient.

Second Aspect

As shown in FIG. 1 to FIG. 7, FIG. 9 and FIG. 10, the present disclosure provides a gear self-tightening drill chuck, comprising a rear pressing cover 10 or a retaining ring 19, a rear body 9, a main body 3, multiple clamping jaws 7, and driven bevel gears 2 in the same number as the clamping jaws 7.

Figure 9:
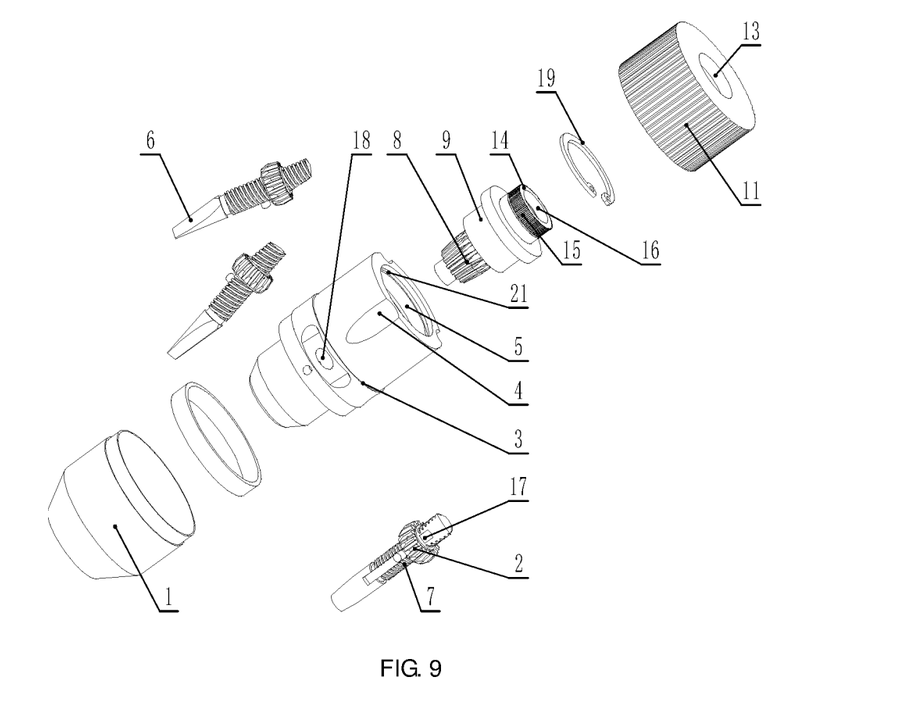
FIG. 9 is an explosive view of another gear self-tightening drill chuck provided in the present disclosure.
Figure 10:
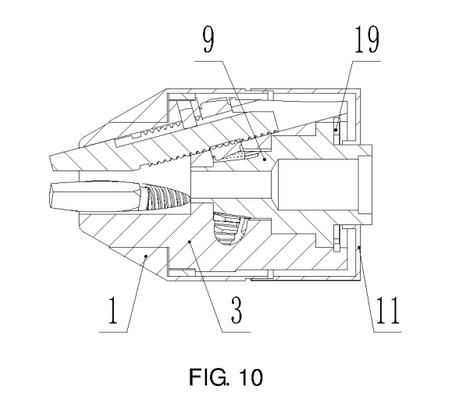
FIG. 10 is a cutaway view of the gear self-tightening drill chuck shown in FIG. 9.

The rear body 9 is arranged in the main body 3.

A driving bevel gear 8 is provided at one end of the rear body 9.

A big end of the driving bevel gear 8 is arranged at an end of the rear body 9 penetrating into the inside of the main body;

A connection portion configured to be connected with an external device is provided at the other end of the rear body 9.

The driving bevel gear 8 is arranged in the main body 3, and is engaged with the driven bevel gears 2.

The multiple driven bevel gears 2 are uniformly arranged around a center line which is an axis of the driving bevel gear 8;

An inner hole of each of the driven bevel gears 2 is provided with an internal thread.

One end of each clamping jaw 7 is provided with an external thread in cooperative use with the internal thread of the respective driven bevel gear 2.

The main body 3 is provided with clamping jaw holes 4 capable of allowing the clamping jaws 7 to pass therethrough and bevel gear holes 18 configured to accommodate the driven bevel gears 2.

The main body 3 has one end provided with an accommodating hole for drilling tool, and the other end provided with a rear hole 5 rotationally connected with the rear body 9.

The rear pressing cover 10 or the retaining ring 19 is arranged at the other end of the main body 3, for fixing the rear body 9 in the rear hole 5.

The rear pressing cover 10 or the retaining ring 19, the rear body 9, the driving bevel gear 8, and the main body 3 are coaxially arranged.

Each of the internal threads and each of the external threads are all multi-start threads.

One end of the main body is provided with an accommodating hole for drilling tool 20, and outside the accommodating hole for drilling tool a front sleeve is provided, and the front sleeve may also be combined with the main body as one piece; the other end of the main body is provided with a rear hole and a rear pressing cover or a retaining ring; the rear pressing cover or the retaining ring, the rear body, the driving bevel gear, the main body, and the front sleeve are coaxially arranged; each of the internal threads and each of the external threads are all multi-start threads. In the present disclosure, it is ensured that the drill chuck, after being clamp-closed and finishing an operation, can be loosened by hand quite easily and conveniently, then an object that the clamping jaws can be opened manually is achieved, and the operation is simple and convenient.

The present disclosure is applicable to all self-tightening drill chucks directly or indirectly transmitting a power to the clamping jaws 7, directly or indirectly by threads, and driving the clamping jaws to move back and forth.

The lead angle of each of the multi-start threads in the present disclosure is based on a pitch diameter of the thread.

A single-start thread is favorable to self-locking, but is unfavorable to loosening. A multi-start thread is favorable to transmission of a power, and favorable to clamping and more favorable to loosening. Moreover, due to an increased contact area between the threads, a clamping force as large as that of the single-start thread is dispersed on a larger contact area, consequently, a unit contact pressure or a unit frictional force of a thread is much smaller than that of the single-start thread, which is more favorable to opening the drill chuck easily. Therefore, in the present disclosure, a multi-start thread is used as a transmission thread between each of the driven bevel gears 2 and the clamping jaws 7.

The driving bevel gear 8 and the rear body 9 are together arranged in the rear hole 5 of the main body 3, and each of the driven bevel gears 2 is arranged in the bevel gear hole 18 of the main body 3, and is engaged with the driving bevel gear 8. Since the rear body 9 is arranged in the rear hole 5 of the main body 3, and the rear body 9 is rotationally connected with the main body 3, in order to ensure stability of the rear body 9 in the main body 3, and to prevent it from escaping from the interior of the rear hole 5 in a process of rotation, a rear pressing cover 10 or a retaining ring 19 is arranged at one end of the main body 3 extending from the rear body, and the rear pressing cover 10 is fixedly connected with the main body 3 by a bolt (or cooperates with the annular groove 21 inside the rear hole on the main body 3 by the retaining ring 19), to further fix the rear body 9 in the rear hole 5, such that the rear body 9 merely can rotate radially relative to the main body 3 but cannot move axially, ensuring stability of the rear body 9 in operation.

In use, by rotating the rear body 9, the driving bevel gear 8 is driven to rotate, the driven bevel gears 2 engaged with the driving bevel gear 8 are further driven to rotate, and the clamping jaws 7 are further driven by the driven bevel gears 2, under the action of the multi-start threads, to move in the clamping jaw holes 4 of the main body 3 respectively, so as to achieve closing or opening of the clamping jaws 7.

The applicant made more than 12000 times of contrast experiment of punching on a cement board for the gear self-tightening drill chuck on an impact drill of 1050 W, with an impact drill bit having a diameter of 12 mm, and with single-start and multi-start threads on the clamping jaws 7 with the same diameter, and the same lead angles of 3°, 4.7°, and 18°, respectively, and data in the following table is obtained.

By comparison of the following tables and a data coordinate graph, advantages of the multi-start threads when the drill chuck is opened can be seen.

TABLE 1

| number of starts of thread | device power | diameter of impact drill bit | lead angle | loosening torque (mean value) |
|---|---|---|---|---|
| single start | 1050 W | Φ12 mm | 3° | 13.1 N · m |
| two starts | 1050 W | Φ12 mm | 3° | 9.4 N · m |
| three starts | 1050 W | Φ12 mm | 3° | 6.7 N · m |

TABLE 2

| number of starts of thread | device power | diameter of impact drill bit | lead angle | loosening torque (mean value) |
|---|---|---|---|---|
| single start | 1050 W | Φ12 mm | 4.7° | 9.7 N · m |
| two starts | 1050 W | Φ12 mm | 4.7° | 4.8 N · m |
| three starts | 1050 W | Φ12 mm | 4.7° | 3.4 N · m |

TABLE 3

| number of starts of thread | device power | diameter of impact drill bit | lead angle | loosening torque (mean value) |
|---|---|---|---|---|
| single start | 1050 W | Φ12 mm | 18° | 8.6 N · m |
| two starts | 1050 W | Φ12 mm | 18° | 4.7 N · m |
| three starts | 1050 W | Φ12 mm | 18° | 3.2 N · m |

It can be seen from the above Table 1, Table 2, Table 3, and FIG. 8 that the larger the lead angle, and the more the number of starts of the thread, the smaller the torque needed when loosening the clamping jaws 7, that is to say, the more labor-saving when loosening the clamping jaws 7.

In a preferred embodiment, the other end of each clamping jaw 7 is provided with two clamping surfaces 6.

An angle between each of the two clamping surfaces 6 is 120°.

In the present embodiment, the clamping jaws 7 are provided in three, each clamping jaw 7 has one end provided with a multi-start thread, and the other end provided with two clamping surfaces 6, the three clamping jaws 7 together have six clamping surfaces 6, and further, by cooperation between the clamping surfaces 6, an article can be completely clamped.

It should be indicated that in the present embodiment, the number of the clamping jaws 7 is three. Therefore, an angle between two clamping surfaces 6 on each clamping jaw 7 is 120°. But the number of the clamping jaws 7 is not merely limited to three, and it also may be four, five, and so on, as long as the angle between the clamping surfaces 6 is correspondingly modified to be 90°, 72° and so on, and an end of each clamping jaw 7 having the clamping surface 6 is enabled to be completely attached with one another in a closed state.

In a preferred embodiment, the lead angle α of each of the multi-start threads is in a range of 3.1≤α≤18.7°.

From repeated multiple times of experiment, it is found that when the lead angle α is smaller than 3.1°, the clamping force will be excessively large, and even a multi-start thread cannot be opened by hand; while when the lead angle α is greater than 18.7°, the clamping force will be reduced greatly, and even a single-start thread cannot clamp a drilling tool (a drill bit) tightly.

Therefore, for the existing self-tightening drill chucks, in order to be capable of ensuring that the drilling tool can be clamped to meet requirements of industrial production, and be capable of meeting the requirement that an operation can be easily performed by hand, a conclusion is drawn in the present disclosure that two conditions have to be fulfilled, that is, the lead angle α is in a range of 3.1≤α≤18.7°.

In a preferred embodiment, each clamping jaw 7 is provided with a positioning groove 17.

Each of the positioning grooves 17 has a length direction parallel to the axis of the respective clamping jaw 7, and can cooperate with a respective positioning portion provided on the main body 3 to prevent the respective clamping jaw 7 from rotating.

Each clamping jaw 7 is provided with the positioning groove 17. With the provision of the positioning groove 17, it can cooperate with the respective positioning portion on the main body 3, to limit a movement direction of the respective clamping jaw 7, and avoid rotation of the respective clamping jaw 7 in a movement process, and further be capable of ensuring that the multiple clamping jaws 7 can be in perfect cooperation.

In a preferred embodiment, each of the positioning portions is a positioning screw.

Each of the positioning screws is detachably provided on the main body 3.

In the present embodiment, each of the positioning portions is a positioning screw, that is, a positioning threaded hole 16 is provided on the main body 3, and the positioning screws are arranged in the positioning threaded hole 16.

When the clamping jaws 7 need to be limited, the positioning screws are tightened up, such that the positioning screws passed through the positioning threaded hole 16 to enter the interior of the positioning grooves 17 respectively, so as to achieve a function of limiting movement tracks of the clamping jaws 7, meanwhile, the clamping jaws 7 and the main body 3 form one intact entirety.

When the clamping jaws 7 need to be maintained or detached, the positioning screws are loosened, such that they are removed from the respective positioning grooves 17, and further, the clamping jaws 7 can be conveniently drawn out completely from the interior of the clamping jaw holes 4 respectively.

It should be indicated that each of the positioning portions in the present embodiment is a positioning screw, but they are not merely limited to the one structure of positioning screw, and they also may be in other structures, for example, they may be pin bolts, sliding blocks, and so on, that is to say, as long as they can limit the movement tracks of the clamping jaws 7 by cooperation with the positioning grooves 17 respectively, and further ensure the stability of the clamping jaws 7 in an operation process.

In a preferred embodiment, an end of the main body 3 close to the rear body 9 is rotationally provided with a rear sleeve 11.

In the present embodiment, the rear sleeve 11 is provided to cover the rear body 9, the rear pressing cover 10 or the retaining ring 19, and the main body 3, and is in rotational sealed connection with the front sleeve 1, enabling effective protection to internal environment of the drill chuck, so as to free it from influence of external environment, prevent pollutants from entering between the main body 3 and the rear body 9, and further ensure rotational stability between the main body 3 and the rear body 9 and the rotation life thereof, and further guarantee service life of the whole gear self-tightening drill chuck.

In a preferred embodiment, an end of the rear body 9 away from the driving bevel gear 8 is provided with a driving portion 14.

The driving portion 14 is in fixed cooperation with the rear sleeve 11, for performing rotational driving under the action of the rear sleeve 11 before and after the drill chuck operates, such that the drill chuck can initially clamp or loosen the drilling tool.

The driving portion 14 cooperates with the rear sleeve 11, for performing rotational driving under the action of the rear sleeve 11.

That is to say, in the present embodiment, the rear body 9 and the rear sleeve 11 are connected therebetween by the driving portion 14, and the rear sleeve 11 can manually drive the rear body 9 by the driving portion 14, such that the rear body 9 rotates relative to the main body 3, to further give the driving bevel gear 8 and the driven bevel gears 2 a rotational force, and further give the clamping jaws 7 a force for closing or loosening.

In a preferred embodiment, the rear sleeve 11 is provided with a driving hole in tight cooperation with the driving portion 14.

In the present embodiment, the driving portion and the driving hole are in structures as shown in FIG. 1, that is, two opposite sides on a side wall of the cylinder are provided with two planes, and on the rear sleeve 11 a driving hole 13 in a corresponding structure is provided. Transmission of the rotational force can be realized by cooperation between the driving hole 13 and the driving portion 14.

It should be indicated that the driving portion and the driving hole may be in structures in the present embodiment, but they are not merely limited to such structures, and they also may be in other types of structures, for example, the driving portion may be in a structure with a square head, an oval head, and so on, and the driving hole is in a structure cooperating with the driving portion in such a structure, that is to say, as long as the transmission of the rotational force can be realized by the cooperation between the driving hole 13 and the driving portion 14.

In a preferred embodiment, the connection portion is a straight hole having an internal thread or a tapered hole having an internal thread.

In the present embodiment, the rear body 9 is connected with a device by the threaded hole 16 having an internal thread.

It should be indicated that in the present embodiment, the threaded hole 16 is a straight hole or a tapered hole, and also may be other types of threaded holes, as long as it can be connected together with other devices.

It should also be indicated that there still may be many connection modes for the rear body 9 and a device, for example, pin shaft connection, and hinged connection, etc., that is to say, as long as the rear body 9 and the device can be connected together.

In a preferred embodiment, the rear sleeve 11 and the rear body 9 are connected therebetween by a clamp spring 12.

In the present embodiment, on a portion of the rear body 9 extending from the rear sleeve 11 a clamping groove 15 is provided, the clamp spring 12 is arranged in the clamping groove 15, to further axially fix and connect the rear sleeve 11 with the rear body 9, ensuring that no axial displacement occurs between the rear sleeve 11 and the rear body 9.

It should be indicated that in the present embodiment, the connection between the rear sleeve 11 and the rear body 9 is a connection by clamp spring 12, but it is not merely limited to such one connection mode, and it also may be other connection modes, for example, it may be pin shaft connection or the like, as long as a axial freedom degree between the rear sleeve 11 and the rear body 9 can be restricted.

The gear self-tightening drill chuck provided in the present disclosure drives the driving bevel gear 8 by driving rotation of the rear body 9, further drives the driven bevel gears 2 to rotate, and further drives movement of the clamping jaws 7, to achieve closing and loosening of the clamping jaws 7, moreover, connecting the clamping jaws 7 and the driven bevel gears 2 by multi-start threads ensures that the clamping jaws 7, after being clamp-closed, can be loosened quite conveniently, then an object that the clamping jaws 7 can be opened manually is achieved, and the operation is simple and convenient.

Finally, it should be explained that the various embodiments above are merely used for illustrating the technical solutions of the present disclosure, rather than limiting the present disclosure. While the detailed description is made to the present disclosure with reference to the preceding embodiments, those ordinarily skilled in the art should understand that they still can modify the technical solutions recited in the preceding embodiments, or make equivalent substitutions to some or all of the technical features therein. These modifications or substitutions do not make the corresponding technical solutions essentially depart from the scope of the technical solutions of the various embodiments of the present disclosure.

What is claimed is:

1. A gear self-tightening drill chuck, comprising
a rear pressing cover, a rear body, a main body, a front sleeve, a plurality of clamping jaws, and driven bevel gears in a same number as the clamping jaws,
wherein the rear body is arranged in the main body;
a driving bevel gear is provided at one end of the rear body;
a big end of the driving bevel gear is provided to be close to the rear body;
a connection portion configured to be connected with an external device is provided at the other end of the rear body;
the driving bevel gear is engaged with the driven bevel gears in the main body;
the plurality of driven bevel gears are uniformly arranged around a center line which is an axis of the driving bevel gear;
an inner hole of each of the driven bevel gears is provided with an internal thread;
one end of each of the clamping jaws is provided with an external thread in cooperative use with the internal thread of the respective driven bevel gear;
the main body is provided with clamping jaw holes capable of allowing the clamping jaws to pass therethrough and bevel gear holes configured to accommodate the driven bevel gears respectively;
the main body has one end fixedly arranged in the front sleeve, and the other end provided with a rear hole rotationally connected with the rear body;
the rear pressing cover is arranged at the other end of the main body, for fixing the rear body in the rear hole;
the rear pressing cover, the rear body, the driving bevel gear, the main body, and the front sleeve are coaxially arranged; and wherein
each internal thread of the driven bevel gear and a corresponding external threads of the clamping jaw coupled to the driven gear are multi-start threads, with a lead angle α of each of the multi-start threads in a range of $3.1° \le \alpha \le 18.7°$.

2. The gear self-tightening drill chuck according to claim 1, wherein the other end of each of the clamping jaws is provided with two clamping surfaces, wherein an angle between each of the two clamping surfaces is 120°.

3. The gear self-tightening drill chuck according to claim 1, wherein each of the clamping jaws is provided with a positioning groove, wherein a length direction of each of the positioning grooves is parallel to an axis of the respective clamping jaw, and each of the positioning groove is capable of cooperating with a respective positioning portion provided on the main body to prevent the respective clamping jaw from rotating.

4. The gear self-tightening drill chuck according to claim 3, wherein each of the positioning portions is a positioning screw, wherein each of the positioning screws is detachably provided on the main body.

5. The gear self-tightening drill chuck according to claim 1, wherein an end of the main body close to the rear body is rotationally provided with a rear sleeve.

6. The gear self-tightening drill chuck according to claim 5, wherein the rear sleeve is connected with the rear body by a clamp spring.

7. The gear self-tightening drill chuck according to claim 1, wherein an end of the rear body away from the driving bevel gear is provided with a driving portion, wherein the driving portion is in fixed cooperation with the rear sleeve, for performing rotational driving under action of the rear sleeve before and after the drill chuck operates, such that the drill chuck is capable of initially clamping or loosening the drilling tool.

8. The gear self-tightening drill chuck according to claim 7, wherein the rear sleeve is provided with a driving hole in tight cooperation with the driving portion.

9. The gear self-tightening drill chuck according to claim 1, wherein the connection portion is a straight hole having an internal thread or a tapered hole having an internal thread.

10. A gear self-tightening drill chuck, comprising
a rear pressing cover, a rear body, a main body, a plurality of clamping jaws, and driven bevel gears in a same number as the clamping jaws,
wherein the rear pressing cover is configured to be coupled with the main body in a press fit passion and the rear body is arranged in the main body;
a driving bevel gear is provided at one end of the rear body;
a big end of the driving bevel gear is arranged at an end of the rear body penetrating into interior of the main body;
a connection portion configured to be connected to an external device is provided at the other end of the rear body;
the driving bevel gear is engaged with the driven bevel gears in the main body;
the plurality of driven bevel gears are uniformly arranged around a center line which is an axis of the driving bevel gear;
an inner hole of each of the driven bevel gears is provided with an internal thread;
one end of each of the clamping jaws is provided with an external thread in cooperative use with the internal thread of the respective driven bevel gear;
the main body is provided with clamping jaw holes capable of allowing the clamping jaws to pass therethrough and bevel gear holes configured to accommodate the driven bevel gears respectively;
the main body has one end provided with an accommodating hole for drilling tool, and the other end provided with a rear hole rotationally connected with the rear body;
the rear pressing cover is arranged at the other end of the main body, for fixing the rear body in the rear hole;
the rear pressing cover, the rear body, the driving bevel gear, and the main body are coaxially arranged; and
each internal thread of the driven bevel gear and a corresponding external thread of the clamping jaw coupled to the driven gear are multi-start threads, with a lead angle α of each of the multi-start threads in a range of $3.1° \le \alpha \le 18.7°$.

11. The gear self-tightening drill chuck according to claim 10, wherein the other end of each of the clamping jaws is provided with two clamping surfaces, wherein an angle between each of the two clamping surfaces is 120°.

12. The gear self-tightening drill chuck according to claim 10, wherein each of the clamping jaws is provided with a positioning groove, wherein a length direction of each of the positioning grooves is parallel to an axis of the respective clamping jaw, and is capable of cooperating with a respective positioning portion provided on the main body to prevent the respective clamping jaw from rotating.

13. The gear self-tightening drill chuck according to claim 12, wherein each of the positioning portions is a positioning screw, wherein each of the positioning screws is detachably provided on the main body.

14. The gear self-tightening drill chuck according to claim 10, wherein an end of the main body close to the rear body is rotationally provided with a rear sleeve.

15. The gear self-tightening drill chuck according to claim 10, wherein an end of the rear body away from the driving bevel gear is provided with a driving portion, wherein the driving portion is in fixed cooperation with the rear sleeve, for performing rotational driving under action of the rear sleeve before and after the drill chuck operates, such that the drill chuck is capable of initially clamping or loosening the drilling tool.

16. The gear self-tightening drill chuck according to claim 15, wherein the rear sleeve is provided with a driving hole in tight cooperation with the driving portion.

17. The gear self-tightening drill chuck according to claim 10, wherein the connection portion is a straight hole having an internal thread or a tapered hole having an internal thread.

18. The gear self-tightening drill chuck according to claim 10, wherein the rear sleeve is connected with the rear body by a clamp spring.

* * * * *